May 10, 1960  H. REUCKER  2,936,053

ELECTRO-MAGNETIC CLUTCH

Filed Oct. 21, 1955

INVENTOR:
Herbert REUCKER

By
Patent Agent

United States Patent Office 2,936,053
Patented May 10, 1960

2,936,053
ELECTRO-MAGNETIC CLUTCH
Herbert Reucker, Bochum-Stiepel, Germany
Application October 21, 1955, Serial No. 541,990
Claims priority, application Germany October 21, 1954
5 Claims. (Cl. 192—84)

This invention relates to electro-magnetic clutches.

In known rotatable electro-magnetic multiplate or disk clutches the pole surfaces of the ring magnet are arranged perpendicularly to the axis of rotation. After exciting the electro-magnet, the armature disk of the clutch compresses the set of plates arranged on the magnetic body. To keep the dimensions of the clutch within reasonable limits, the initial air gap, that is, the air gap before the start of the stroke, cannot be made larger than some tenth of a millimeter. To overcome the effect of the residual magnetism in such arrangements and thus avoid sticking of the armature disk on the pole surfaces, a remaining or final air gap is provided which for reasons of manufacture must be on the order of 1/10 mm., although a shorter distance would be preferable. The admissible amount of wear and tear is about 1/10 mm. smaller than the entire air gap and in the prior designs has a value smaller than desired. After this small amount is exhausted, the clutch has to be adjusted. This is a great disadvantage in clutches which have to be operated frequently especially as the adjustment is difficult if the clutch is accommodated in places which are not easily accessible, for example, within gear casings.

It is an object of the invention to avoid the above disadvantages and provide a clutch in which while the restricted dimensions of the known clutches are maintained, the allowance for wear and tear is at least doubled, and which possesses further essential advantages which will be described in detail in the following specification.

According to the invention the clutch is provided with conical pole and armature surfaces instead of the plane pole surfaces hitherto used. The armature disk is enclosed from three sides by the magnet body, only a small part of this disk projecting beyond the annular magnet body circumferentially to transfer the magnetic force to the set of plates. The magnet body being the carrier of the interior plates if the set of friction plates can therefore become substantially longer and for this reason can receive more pairs of plates than a magnet body having plane pole surfaces. The axial compressive force necessary for transferring the torque becomes smaller and the heat capacity of the plate body increases. As the lines of force are directed at right angles to the pole surfaces, the direction and intensity of the pull are determined by the angle of the cone (i.e., the angle between side and axis of the cone) and the compressive force required at the plates. The magnetic power should be equal to the required compressive force divided by the sine of the angle of the cone and corresponds approximately to the compressive force of a clutch having plane pole surfaces and a lower number of friction plates. In the case of equal areas of the pole surfaces the inductive power necessary for magnetization of the same air gap would be the same. Since the area of each conical pole surface is $$\frac{1}{\sin \text{ conical angle}}$$

times as large as the area of its base, the required induction and therefore the necessary ampere turns are substantially smaller than in the case of generally similar clutches having plane pole surfaces. By using an exciting coil with a large number of ampere turns, the air gap between the conical pole and armature surfaces may be increased. The admissible extent of wear and tear, which is about 0.1 mm. smaller than the maximum stroke of the armature disk, now has a value which is about 220 to 280% larger than in the case of electromagnetic clutches, the plates of which are arranged on a magnetic body having plane pole surfaces. In addition to the fact that the admissible amount of wear and tear is increased more than twofold, the new clutch has the advantage of lower wear under the same conditions on account of the larger number of friction surfaces and the smaller compressive force necessary. The heat capacity of the plate body is improved at least 40% and therefore the clutch according to the invention is better suited for accelerating large masses with unchanged own moment of inertia. Quick and continuous ventilation of the plates of the disengaged clutch is effected by resilient exterior plates. Therefore, the no-load couple is so little that it amounts to less than 1% of the couple in the engaged state of the clutch.

Figure 1:
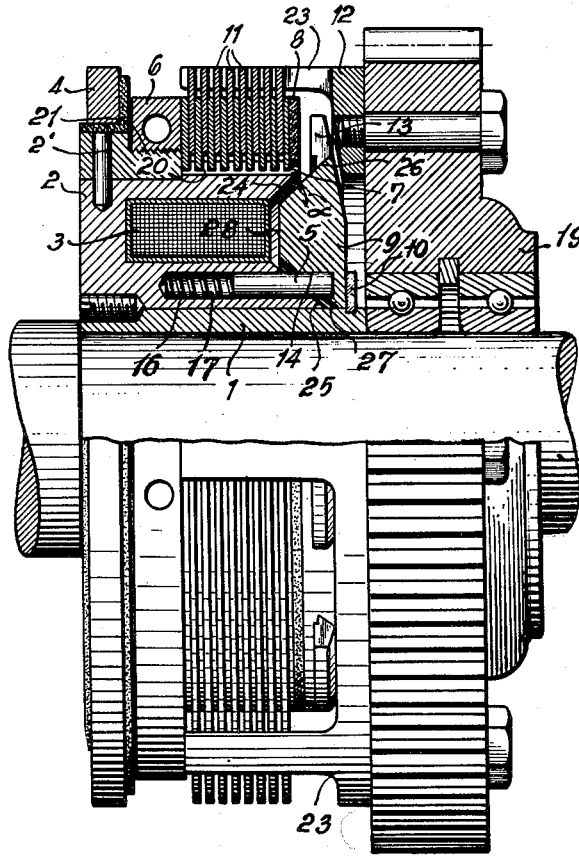
Figure 1 is partly a longitudinal section along a line similar to line 1—1 of Fig. 3 and partly an elevation of the improved electro-magnetic clutch, the parts being shown in the de-energized condition.

A sleeve 1 consisting of non-magnetic material is arranged in a clutch or magnet body 2 containing an annular magnet coil 3 and carrying a flange 2' which supports an insulated collector ring 4 shrunk on it. A plurality of openings 16 are provided in the part of the clutch surrounded by the magnet coil 3 on a circle concentric to the clutch axis and accommodate a plurality of springs 17 and pins 5. The clutch body 2 may be coupled with the driving part or shaft 18, and the driven part may be connected to the outer body 12, or vice versa, a gear wheel 19 or the like being mounted on body 12. The cylindrical exterior surfaces of parts 2, 2' are provided with splines 20 and thread 21, respectively, serving for accommodating the interior plates 7 and the adjusting ring 6 which is threaded at 22 (see Fig. 2). That of the inner plates 7 which is closest to the armature disk 9 carries a non-magnetic ring 8 riveted on the face of said plate, said face being opposite the disk 9, whereby the ring 8 is adapted to be engaged by the disk 9 when the latter is attracted by the magnet body 2 upon energization of the magnet coil 3. Upon de-energization of said magnet coil 3, the disk 9 is returned to its disengaged position shown in Figure 1 under the action of the springs 17 acting on the pins 5 which support the disk 9. Sleeve 1 supports the armature disk 9 and an outer safety ring 10 limiting the stroke of the armature disk. Between the interior plates 7, the outer plates 11 are arranged, which transmit the rotation to the outer body 12. To this end, the outer body has arms 23 engaging keyways in the outer plates 11.

Figure 2:
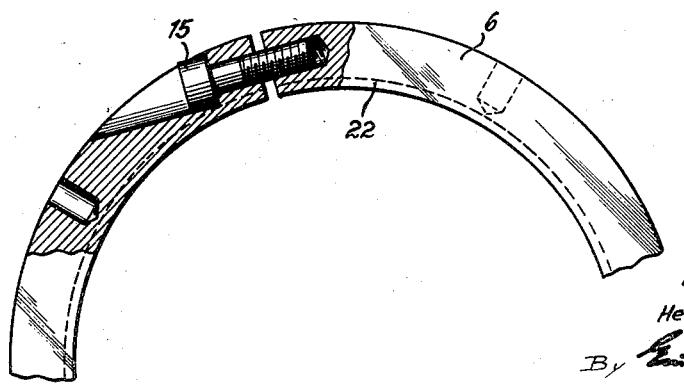
Figure 2 is a view, partly in section, of a portion of the adjusting ring.

As can be seen from Figure 2, the adjusting ring 6 is provided with a clamping screw 15 by the tightening of which the ring can be contracted. By this action the adjusting ring is secured against rotation.

Figure 3:
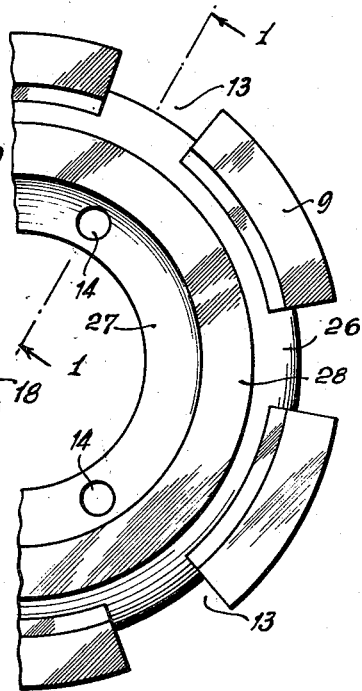
Figure 3 is a fragmentary view of the armature disk showing the side facing the magnet.

Referring to Fig. 3 which shows a partial view of the armature disk, slots 13 provided on the periphery of this disk serve for introducing a measuring device for the purpose of controlling the air gap and for reducing the movable armature mass. The resiliently mounted pins 5 engage holes 14 arranged in the armature disk on a circle concentric to the clutch axis.

The magnet body 2 is provided with spaced conical pole surfaces 24, 25 forming a recess in the magnet body, and a chamber extends from the recess into the body to accommodate the annular cylindrical coil 3, the plane ends of which are perpendicular to the axis of the clutch. One of the ends of coil 3 is positioned intermediate the conical surfaces 24, 25 so that it forms the bottom of the recess. Similar spaced conical surfaces 26, 27 are arranged on the armature disk 9 and project into the recess of the magnet body 2 so that the latter partially surrounds or embraces the disk. A plane surface 28 perpendicular to the axis of the clutch is provided on the disk between surfaces 26, 27 to face the adjacent end of coil 3. Each of the conical surfaces 24 to 27 represents the outer surface of a frustum of a cone. The cooperating conical surfaces 24, 26, and 25, 27 are preferably equiangular so that they have parallel sides. In the embodiment shown the angle $\alpha$, which is equivalent to the angle between side and axis of the respective truncated cone, is in the neighborhood of 45° at each of the conical surfaces.

It will be clear that the wear reserve distance between parallel sides 24, 26, and 25, 27, measured in the axial direction of the clutch, is considerably larger than the perpendicular distance between the same sides and is equal to the latter distance times $$\frac{1}{\sin \alpha}$$

When comparing this arrangement with a clutch wherein the perpendicular distance between electro-magnet and armature disk is the same as in the conical design but the pole surfaces and the cooperating surfaces of the disk are plane, it will be apparent that the conical design leads to a much larger stroke. This in turn increases the admissible extent of wear and tear so that adjustments will be required less frequently. As the recessed portion of body 2 extends over and surrounds a part of the armature disk, the circumferential surface of body 2 is relatively long in the axial direction so that a relatively great number of friction plates may be accommodated thereon. Various further advantages are obtained by the conical shape of the pole and disk surfaces as set forth hereinbefore.

I claim:

1. In an electro-magnetic multi-plate clutch, shaft means, an annular magnet body on said shaft means, a first set of friction plates parallel with respect to one another and mounted on and circumferentially surrounding said body, a second set of friction plates interleaved between the friction plates of said first set and also circumferentially surrounding said body, annular means on said shaft, means to rotatably mount said second set of friction plates for rotation with respect to said magnet body, an energizing coil on said magnet body, an armature disc mounted coaxially on said magnet body and being displaceable relative thereto when said coil is energized or de-energized, a conical pole surface on said magnet body, a conical surface on said armature disc cooperating with said conical pole surface on said magnet body, said respective conical surfaces of said magnet body and said armature remaining spaced from each other during engagement of said clutch, and means extending radially from said armature disc and outside the magnetic field lines between said magnet body and said armature disc to apply pressure to said sets of friction plates when said coil is energized and said armature disc is attracted, whereby said two sets of friction plates become frictionally interengaged.

2. A clutch as specified in claim 1, in which the conical pole surface of the magnet body and the conical surface of the armature disk are inclined at an angle of about 45°.

3. In an electro-magnetic multi-plate clutch, shaft means, an annular magnet body on said shaft means, a first set of friction plates supported by and circumferentially surrounding said magnet body, a second set of friction plates interleaved between the friction plates of said first set and also circumferentially surrounding said magnet body, means on said shaft means to support said second set of friction plates for rotation with respect to said magnet body, an armature disk in adjacency with said second set of friction plates and coaxially mounted with respect to said magnet body between the latter and said supporting means for said second set of friction plates, said armature disk being movable relative to said magnet body when said electro-magnetic clutch is energized or deenergized to act on said sets of friction plates, a conical surface in said magnet body defining a recess therein, a conical surface on said armature disk having a predetermined conical angle and projecting into said recess of said magnet body, the conical surfaces of said magnet body and said armature disk remaining spaced from each other during engagement of said clutch and being disposed at a distance measured in the axial direction of said clutch to define a wear reserve distance for adjustment of said friction plates, said wear reserve distance being equal to the perpendicular distance between said respective conical surfaces divided by the sine of said conical angle of said armature disk, thereby increasing the permissible extent of wear of said respective friction plates per adjustment.

4. In an electro-magnetic clutch as set forth in claim 3, including an adjusting ring cooperable with said first set of friction plates for adjusting the spacing between said respective friction plates in order to compensate for wear thereof.

5. In an electro-magnetic clutch as set forth in claim 3, wherein said armature disc is provided with slots adapted to receive a measuring instrument for determining the spacing between said respective conical surfaces while additionally reducing the mass of said armature disc.

References Cited in the file of this patent

UNITED STATES PATENTS

| Re. 12,581 | Schuster | Dec. 18, 1906 |
| 731,474 | Le Pontois | June 23, 1903 |
| 1,760,174 | Schunemann | May 27, 1930 |
| 2,672,965 | Miller | Mar. 23, 1954 |

FOREIGN PATENTS

| 387,487 | Germany | Dec. 28, 1923 |
| 659,890 | Germany | May 12, 1938 |
| 214,237 | Switzerland | July 1, 1941 |